US008925058B1

United States Patent
Dotan et al.

(10) Patent No.: US 8,925,058 B1
(45) Date of Patent: Dec. 30, 2014

(54) AUTHENTICATION INVOLVING AUTHENTICATION OPERATIONS WHICH CROSS REFERENCE AUTHENTICATION FACTORS

(75) Inventors: Yedidya Dotan, Tel Aviv (IL); William M. Duane, Westford, MA (US); John Linn, Carlisle, MA (US); Roy Hodgman, Wenham, MA (US); Derek Lin, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/434,257

(22) Filed: Mar. 29, 2012

(51) Int. Cl.
G06F 7/04 (2006.01)
G06F 15/16 (2006.01)

(52) U.S. Cl.
USPC ............... 726/7; 726/1; 726/18; 713/186

(58) Field of Classification Search
CPC .................. H04L 63/0861; G06F 21/32
USPC ........................................... 726/7
See application file for complete search history.

(56) References Cited

U.S. PATENT DOCUMENTS

| | | | |
|---|---|---|---|
| 2004/0120554 A1* | 6/2004 | Lin et al. ................. | 382/118 |
| 2004/0193415 A1* | 9/2004 | Chaudhari et al. ........ | 704/246 |
| 2007/0192038 A1* | 8/2007 | Kameyama ............... | 702/19 |
| 2007/0288759 A1* | 12/2007 | Wood et al. ............... | 713/186 |
| 2008/0046368 A1* | 2/2008 | Tidwell et al. ............. | 705/44 |
| 2009/0067647 A1* | 3/2009 | Yoshizawa et al. ........ | 381/119 |
| 2009/0116703 A1* | 5/2009 | Schultz .................... | 382/118 |
| 2009/0138405 A1* | 5/2009 | Blessing .................. | 705/67 |
| 2009/0228370 A1* | 9/2009 | Shakkarwar .............. | 705/26 |
| 2009/0232361 A1* | 9/2009 | Miller ...................... | 382/115 |
| 2010/0122316 A1* | 5/2010 | Lyon ....................... | 726/1 |
| 2011/0071830 A1* | 3/2011 | Kim et al. ................. | 704/246 |
| 2011/0072500 A1* | 3/2011 | Varghese ................. | 726/7 |
| 2011/0224978 A1* | 9/2011 | Sawada ................... | 704/231 |
| 2011/0225625 A1* | 9/2011 | Wolfson et al. ............ | 726/1 |
| 2011/0246754 A1* | 10/2011 | Porwal .................... | 713/1 |
| 2011/0296440 A1* | 12/2011 | Laurich et al. ............ | 719/326 |
| 2011/0305384 A1* | 12/2011 | Aoyama et al. ........... | 382/159 |
| 2011/0307403 A1* | 12/2011 | Rostampour et al. ...... | 705/325 |
| 2012/0136793 A1* | 5/2012 | Valin et al. ............... | 705/53 |
| 2012/0253805 A1* | 10/2012 | Rajakumar et al. ........ | 704/236 |

(Continued)

OTHER PUBLICATIONS

"Biometric Liveness Detection Based on Cross Modal Fusion" 12th International Conference on Information Fusion Seattle, WA, USA, Jul. 6-9, 2009.*

(Continued)

*Primary Examiner* — Linglan Edwards
*Assistant Examiner* — Gary Gracia
(74) *Attorney, Agent, or Firm* — BainwoodHuang

(57) ABSTRACT

A technique of authenticating a person involves obtaining, during a current authentication session to authenticate the person, a first authentication factor from the person and a second authentication factor from the person, at least one of the first and second authentication factors being a biometric input. The technique further involves performing an authentication operation which cross references the first authentication factor with the second authentication factor. The technique further involves outputting, as a result of the authentication operation, an authentication result signal indicating whether the authentication operation has determined the person in the current authentication session likely to be legitimate or an imposter. Such authentication, which cross references authentication factors to leverage off of their interdependency, provides stronger authentication than conventional naïve authentication.

21 Claims, 5 Drawing Sheets

(56) References Cited

U.S. PATENT DOCUMENTS

| | | | |
|---|---|---|---|
| 2012/0254243 A1* | 10/2012 | Zeppenfeld et al. | 707/778 |
| 2013/0127591 A1* | 5/2013 | Shay et al. | 340/5.52 |
| 2013/0232073 A1* | 9/2013 | Sheets et al. | 705/44 |
| 2013/0239191 A1* | 9/2013 | Bostick | 726/7 |

OTHER PUBLICATIONS

Multi-Level Liveness Verification for Face-Voice Biometric Authentication, Girija Chetty and Michael Wagner, Conference: Biometric Consortium Conference, 2006.*

Fusion of Face and Speech Data for Person Identity Verification Souheil Ben-Yacoub, Yousri Abdeljaoued, and Eddy Mayoraz, Member, IEEE, 1999.*

A Method of Risk Assessment for Multi-Factor Authentication, Jae-Jung Kim, and Seng-Phil Hong, Journal of Information Processing Systems, vol. 7, No. 1, Mar. 2011.*

Improving fusion with margin-derived confidence in biometric authentication tasks, 2005 Proceedings of the 5th international conference on Audio- and Video-Based Biometric Person Authentication.*

* cited by examiner

AUTHENTICATION INVOLVING AUTHENTICATION OPERATIONS WHICH CROSS REFERENCE AUTHENTICATION FACTORS

BACKGROUND

Some conventional computerized environments require successful user authentication before providing user access. For example, suppose that a user is required to provide a username, a password, and a biometric reading in order to obtain access to a computer. Examples of a suitable biometric reading include a fingerprint scan, a retina scan, a voice scan and a facial scan.

During authentication, authentication circuitry retrieves a profile of the user from a database based on the username provided by the user (i.e., who the user claims to be). The profile identifies an expected password (e.g., a one-time password, a static password, etc.) and an expected biometric reading.

Next, the authentication circuitry compares the password provided by the user to the expected password. Additionally, the authentication circuitry compares the biometric reading provided by the user to the expected biometric reading. If the authentication circuitry finds that the passwords match each other and that the biometric readings match each other, authentication is successful and the authentication circuitry provides the user with access to the computer. However, if the authentication circuitry finds either that the passwords do not match or that the biometric readings do not match, authentication is unsuccessful and the authentication circuitry does not provide the user with access to the computer.

SUMMARY

Unfortunately, there are deficiencies to the above-described conventional authentication approach which naively compares passwords to each other, and biometric readings to each other. For example, such an approach which is hereinafter referred to as the naïve authentication approach, treats each authentication input as being independent of all other authentication inputs. That is, such authentication does not take into account whether correlation exists between authentication inputs. Accordingly, security provided by the conventional naïve authentication approach is relatively weak.

Moreover, robust and reliable biometric authentication is generally difficult. In particular, biometrics may undergo drift and other changes (e.g., changes in hair length, facial changes due to aging, surgery, accidents, and so on) resulting in false negative authentication results. Additionally, individual biometrics can be sensitive to replay attacks (e.g., showing photos/videos, stealing and reusing fingerprints, etc.) depending on the sensing methods employed.

In contrast to the above-described deficiencies, an improved technique involves authentication which cross references multiple authentication factors, at least one of the authentication factors being a biometric input. Such cross referencing enables the amount of correlation between authentication factors to influence the authentication result. For example, if a person concurrently provides a voice scan and a facial scan for authentication, there should be a high amount of correlation between the scans (e.g., correlated voice and facial movement while the person speaks). As another example, if a person successfully authenticates in the morning, it should be expected that the person's hair length should not be shorter during another authentication attempt by the same person at the end of the day (one authentication factor being a facial scan and another authentication factor being time of day or the amount of time since the last authentication). Poor correlation between authentication factors with such strong interdependence is a sign of inconsistency perhaps due to an attack, e.g., an imposter posing as the legitimate person or a replay of an authentication factor. Accordingly, such improved authentication which cross references authentication factors is capable of providing stronger authentication than conventional naïve authentication.

One embodiment is directed to a method of authenticating a person. The method includes obtaining, during a current authentication session to authenticate the person, a first authentication factor from the person and a second authentication factor from the person, at least one of the first and second authentication factors being a biometric input. The method further includes performing an authentication operation which cross references the first authentication factor with the second authentication factor. The method further includes outputting, as a result of the authentication operation, an authentication result signal indicating whether the authentication operation has determined the person in the current authentication session likely to be legitimate or an imposter.

In some arrangements, performing the authentication operation includes generating a correlation result based on an amount of correlation between the first authentication factor and the second authentication factor. In these arrangements, the authentication result signal is based on the correlation result.

In some arrangements, performing the authentication operation further includes performing multifactor authentication based on (i) the first authentication factor, (ii) the second authentication factor, and (iii) the correlation result to produce the authentication result signal. In these arrangements, the authentication operation accomplishes standard multifactor authentication but such multifactor authentication includes an evaluation of the correlation result as a separate authentication factor.

In other arrangements, performing the authentication operation further includes providing the correlation result to a risk engine which is constructed and arranged to perform an adaptive authentication operation based on the correlation result. Here, the authentication result signal (e.g., a risk score) is outputted by the risk engine and is based on the correlation result (e.g., a correlation score).

In some arrangements, the method further includes performing a vitality test based on the biometric input. Here, the authentication result signal is further based on a result of the vitality test.

In some arrangements, the authentication operation takes in several authentication factors, i.e., more than two authentication inputs with at least one being a biometric. In these arrangements, when the authentication factors are strongly correlated with each other to represent a particular user, such correlation does not suffice to authentication another user.

Other embodiments are directed to systems, apparatus, processing circuits, computer program products, and so on. Some embodiments are directed to various methods, electronic components and circuitry which are involved in performing authentication operations which cross reference authentication factors to leverage off of their interdependency, and thus provide stronger authentication than conventional naïve authentication.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques involve authentication which cross references multiple authentication factors, at least one of the authentication factors being a biometric input (e.g., voice input, visual input, etc.). Such cross referencing enables the amount of correlation between authentication factors to impact the authentication result. In particular, poor correlation between authentication factors with strong interdependence is a sign of inconsistency perhaps due to an imposter or a replay attack. As a result, such authentication which cross references authentication factors is capable of providing stronger authentication than conventional naïve authentication.

Figure 1:
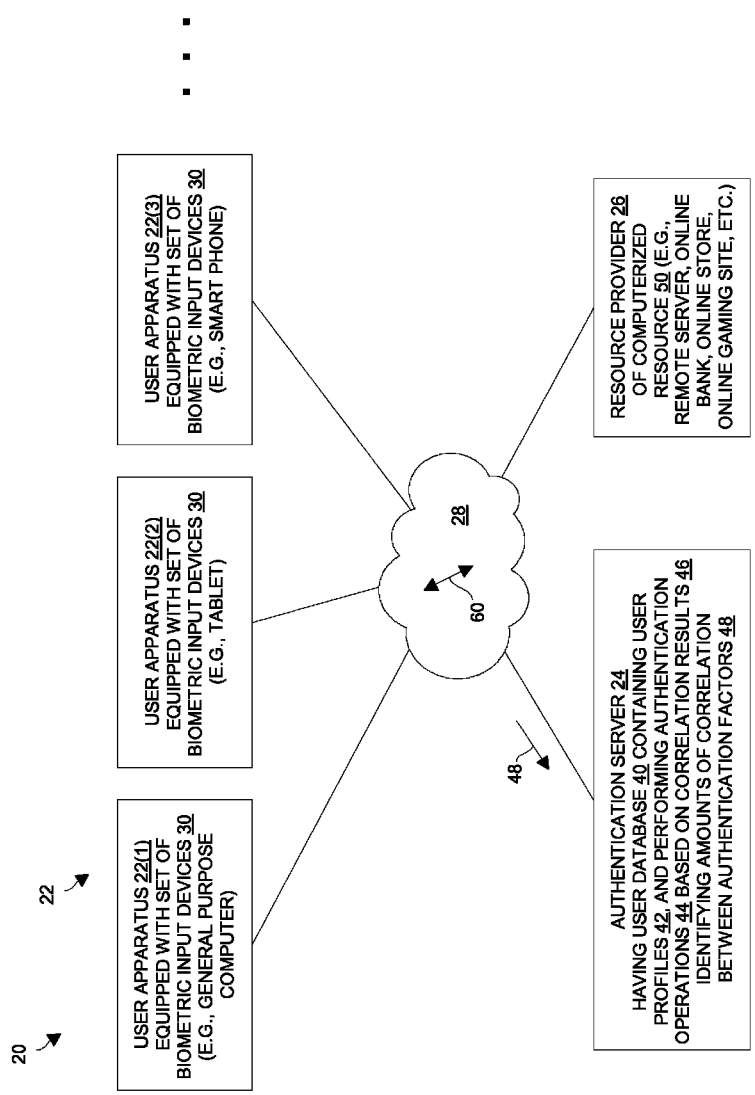
FIG. 1 is a block diagram of an electronic environment for performing authentication which cross references multiple authentication factors.

FIG. 1 shows an electronic environment 20 for performing authentication which cross references authentication factors. The electronic environment 20 includes user apparatus 22(1), 22(2), 22(3), . . . (collectively, user apparatus 22), an authentication server 24, a resource provider 26, and communications medium 28.

Each user apparatus 22 is equipped with a set of biometric input devices 30 (i.e., one or more biometric input devices) and is constructed and arranged to perform useful work on behalf of a user. With the set of biometric input devices 30, each user apparatus 22 has the ability to capture biometric input from a user. For example, the user apparatus 22(1) may be a general purpose computer with a microphone and a webcam. Similarly, the user apparatus 22(2) may be a tablet with a microphone and a built-in digital camera. Additionally, the user apparatus 22(3) may be a smart phone with a microphone and a built-in camera, and so on. With such biometric input devices 30, the user apparatus 22 are able to capture audio and video input for use in authentication without any need for extra hardware.

It should be understood that other devices can be employed to capture biometric input as well. For example, a keyboard and a pointer (i.e., mouse, touchpad, trackball, etc.) of each user apparatus 22 are capable of easily obtaining biometric input from users. Examples of biometric input which can be obtained by a keyboard include typing habits (e.g., typing speed, error rate, typing trends, etc.). Similarly, examples of biometric input which can be obtained from a pointer include pointing habits (e.g., pointer speed, swiping directions and frequencies, etc.).

Of course, each user apparatus 22 has the ability to obtain non-biometric user input as well. Examples of non-biometric user input include password information (e.g., one-time passcodes, static passwords, personal identification numbers, etc.), authentication time of day, geo-location, browser capabilities, and so on.

The authentication server 24 includes a user database 40. The authentication server 24 is constructed and arranged to store user profiles 42 for multiple users in the user database 40, and to perform authentication operations using the user profiles 42. The user profiles 42 store user-specific data defining expected authentication factors. In some arrangements, the user profiles 42 include audio information for audio input analysis (e.g., voice recognition) and visual information for visual input analysis (e.g., face recognition, etc.). As will be explained in further detail shortly, the authentication server 24 is further constructed and arranged to perform authentication operations 44 which generate correlation results 46 identifying amounts of correlation between authentication factors 48, and which provide authentication results based on the correlation results 46.

The resource provider 26 provides each user apparatus 22 with access to one or more computerized resources 50 following successful user authentication through that user apparatus 22. An example of a suitable resource provider 26 is a data storage array which provides secure access to files, directories, volumes, LUNs, etc. Another example of a suitable resource provider 26 is a web server which provides secure access to various web pages. Yet another example of a suitable resource provider 26 is a server which provides secure user account and/or transactional access such as that for an online banking site, an online store, an online gaming site, and so on. Other types of resource providers 26 are suitable for use as well.

The communications medium 28 connects the various components of the electronic environment 20 together to enable these components to exchange electronic signals 60 (e.g., see the double arrow 60). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based devices and cabling, fiber optic devices and cabling, wireless devices, combinations thereof, etc.

During operation, a user of a user apparatus 22 begins an authentication session in hope of authenticating and then obtaining access to a resource 50 (or resources 50). Without successful authentication, the user is prohibited from accessing the resource 50.

As part of the authentication session, the authentication server 24 receives authentication factors 48 from the user through the user apparatus 22. As mentioned earlier, at least one of the authentication factors 48 is a biometric input such as a series of visual images of the user's face, audio of the user's voice, typing input, mouse input, and so on. Other authentication factors 48 may be non-biometric (e.g., authentication time, geolocation, browser capabilities, cookies, etc.).

Next, the authentication server 24 performs an authentication operation 44 which compares received (or current) authentication factors 48 with expected authentication factors 48. Along these lines, the authentication server 24 performs a biometric similarity evaluation on the biometric input (e.g., a voice recognition operation, a face recognition operation, etc.).

Additionally, the authentication server 24 generates a correlation result 46 indicating an amount of correlation between two interdependent authentication factors 48, at least one being the biometric input. That is, the authentication server 24 cross references the biometric input with at least one other authentication factor 48 which is interdependent with the biometric input. Depending on the nature of the biometric input, the authentication server 24 performs an appropriate correlation measurement operation to assess the amount of correlation. For example, if audio and video input are both available, the authentication server 24 is capable of comparing these two authentication factors in a side-by-side manner to determine whether there is consistency.

As another example, if video input and time of day are available, the authentication server 24 is capable extracting a current pulse (or cardiac) waveform from the video input, adjusting an expected pulse waveform based on the time of day (e.g., to adjust for circadian rhythms), and then comparing the two to determine whether the current pulse wave correlates with the time of day. Moreover, in some arrangements, contextual data is extracted from the biometric input and evaluated. For instance, with video input and time of day available, the temperature of ambient light is expected to be different at different times of the day (natural light from a room with windows in the day vs. artificial light from a light bulb at night).

One should appreciate that the authentication server 24 may consider a variety of time elements as the second authentication factor 48, and adjust expected biometrics based on time. For example, there should be consistency in hair length change since the last authentication (i.e., elapsed time), heart rate change based on time of day, skin tone/hue based on time of year (i.e., season), and so on. Rather than simply determine whether similarities exist between the current sample and previous samples, the authentication server 24 is capable of confirming that any change is in an expected or predictable direction (e.g., longer hair, slower/faster heart rate, darker/lighter skin tone, etc.).

A large amount of correlation between the biometric input and the other authentication factor 48 indicates consistency between authentication factors 48 and thus greater confidence that the user is legitimate. However, a low amount of correlation indicates inconsistency between authentication factors 48 and thus higher risk, i.e., a greater possibility of an attack. Further details of the authentication operation 44 will be provided shortly.

Upon completion of the authentication operation 44, the authentication server 24 outputs an authentication result signal as a result of the authentication operation 44. The authentication result signal indicates whether the authentication operation 44 has determined the user in the current authentication session likely to be legitimate or an imposter. Accordingly, the authentication result signal (e.g., a successful or unsuccessful authentication value, a weight/score, a partial result or factor to be combined with other factors, etc.) is then used (directly or indirectly) to control user access to the computerized resource 50.

In some arrangements, the authentication server 24 receives the authentication factors 48 directly from the user apparatus 22 (i.e., the user attempts to authenticate directly with the authentication server 24) or indirectly through the remote protected resource 26 (i.e., the user attempts to authenticate with the resource provider 26 which then delegates the authentication task to the authentication server 24). In these arrangements, the authentication server 24 derives a current set of biometric measurements from the biometric input and compares the current set of biometric measurements to an expected set of biometric measurements to determine whether the user is authentic or an imposter (e.g., a standard voice recognition and/or face recognition operation).

One should appreciate that the authentication server 24 performs operations beyond a conventional naïve authentication approach by generating the correlation result 46 identifying an amount of correlation between the biometric input and another authentication factor 48 obtained during the authentication session. In one arrangement, the correlation result 46 and the results of the biometric comparison are included as risk-based authentication inputs in risk-based authentication. In another arrangement, the correlation result 46 and the results of the biometric comparison are included as a factor in multi-factor authentication. In still another arrangement, the combination of the correlation result and the results of the biometric similarity comparison operate as the final authentication result (i.e., a simple binary yes/no which is not otherwise risk-based or multi-factor authentication).

In some arrangements, the user apparatus 22 which captures the biometric input is further tasked with extracting the current biometric measurements from the biometric input. In these arrangements, the user apparatus 22 then sends the current biometric measurements to the authentication server 24 which, in turn, completes the authentication process. Such offloading of the extraction process from the authentication server 24 to the user apparatus 22 lowers bandwidth through the communications medium 28 and consumes less processing resources at the authentication server 24.

In other arrangements, each user apparatus 22 not only performs the extraction operation, but also locally stores one or more user profiles 42 as well as performs the comparison operation. In these arrangements, each user apparatus 22 essentially operates as its own localized authentication server 24 to perform the entire authentication process including the comparison of biometric measurements.

It should be understood that various other modifications can be made to create other arrangements. For instance, in some arrangements, the computerized resource 50 resides locally within the user apparatus 22. Additionally, the electronic environment 20 is well-suited to support various combinations of these arrangements. Further details will now be provided with reference to FIG. 2.

Figure 2:
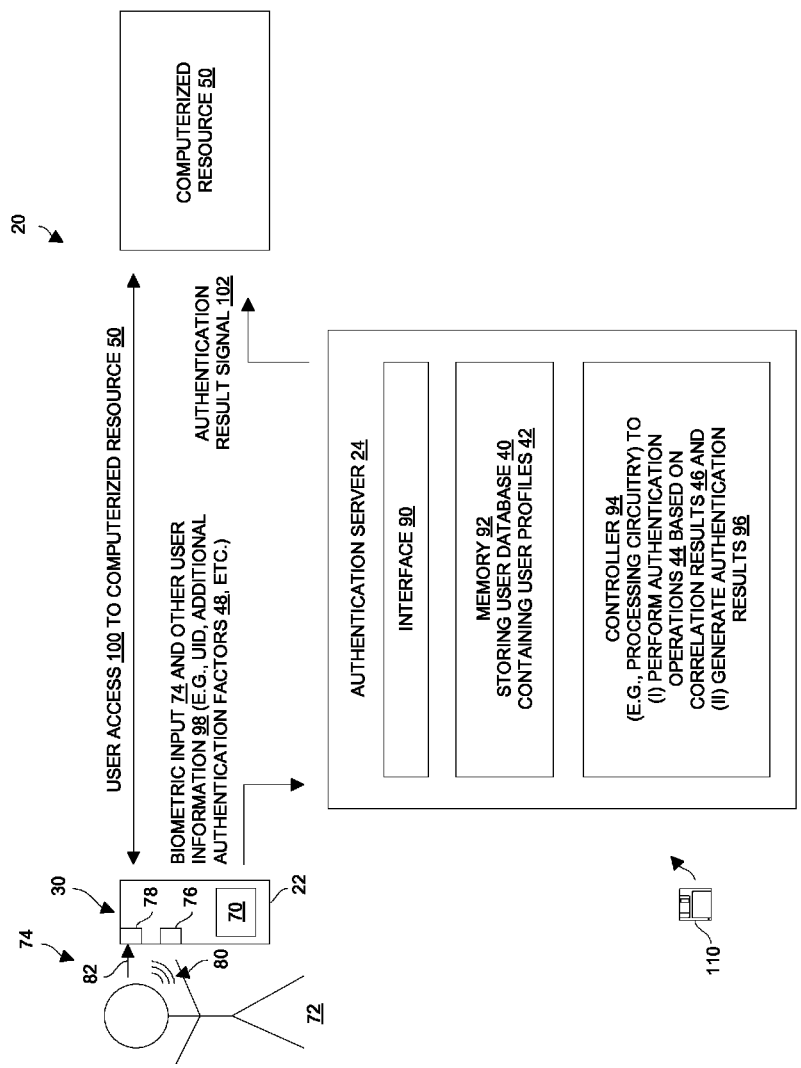
FIG. 2 is a block diagram of particular details of the environment of FIG. 1 during an authentication process.

FIG. 2 shows particular details of the electronic environment 20 during the authentication process. In the scenario illustrated in FIG. 2, the authentication server 24 is external to the user apparatus 22, and the authentication server 24 performs authentication taking multiple authentication factors 48 including biometric input.

As shown, the user apparatus 22 includes a set of biometric input devices 30 and processing circuitry 70 for performing useful work. When a user 72 operates the user apparatus 22, the user 72 allows the set of biometric input devices 30 to collect biometric input 74. By way of example, the set of biometric input devices 30 includes a microphone 76 and a camera 78. In this example, the user 72 positions his or her head so that the microphone 76 captures audio input 80 from the user 72 (e.g., live audio of the user's voice) and the camera 78 captures video input 82 from the user 72 (e.g., live video of the user's face).

The processing circuitry 70 then buffers and transmits the biometric input 74 (e.g., audio input 80 and video input 82) from the set of biometric input devices 30 (or alternatively performs certain local processing before transmitting processed data) to the authentication server 24. Such a transmission may take place over a network (e.g., see the communications medium 28 in FIG. 1).

As further shown in FIG. 2, the authentication server 24 includes an interface 90, memory 92 and a controller 94. The interface 90 allows the authentication server 24 to communicate with other components of the electronic environment 20 through the communications medium 28 (also see FIG. 1). The memory 92 stores the user database 40 which includes user profiles 42 for each user 72 as well as other data (e.g., additional user information). The controller 94 performs the authentication operations 44 which consider correlation between authentication factors 48 (at least one authentication factor 48 being a biometric input 74), and generates authentication results 96 to control access to the computerized resource 50.

Along these lines, suppose that the user 72 wishes to authenticate with the authentication server 24. It is assumed that the user 72 has previously completed a setup process to store a user profile 42 (FIG. 1) in the user database 40 of the authentication server 24.

To begin the authentication process, the user 72 provides biometric input 74 and other user information 98 to the authentication server 24 (also see the electronic signals 60 in FIG. 1). For example, the user may communicate with the authentication server 24 directly as part of a front-end authentication process prior to attempting to access the computerized resource 50. Alternatively, the user may communicate with other circuitry to authenticate (e.g., the resource provider 26 in FIG. 1) and, in turn, that circuitry communicates with the authentication server 24 to initiate the authentication process.

In either situation, the authentication server 24 receives authentication factors 48 for use in authenticating the user 72. Among the authentication factors 48 is the biometric input 74 captured from the set of biometric input devices 30. The other user information 98 may include a user identifier (e.g., a username) to indicate who the user 72 claims to be and perhaps other non-biometric authentication factors 48 such a password or personal identification number (PIN), a one-time passcode (OTP), date and time information, specific software and hardware information, ISP information, other authentication factors, combinations thereof, and so on.

Next, the authentication server 24 performs an authentication operation 44. In particular, the controller 94 of the authentication server 24 generates a correlation result 46 based on an amount of correlation between a first authentication factor 48 and a second authentication factor 48 where an interdependency exists between the first and second authentication factors 48. For example, if the user 72 had successfully authenticated in the morning, it should be expected that the user's hair length should be longer, if anything, during another authentication attempt by the user at the end of the day (e.g., one authentication factor 48 being a facial scan and another authentication factor being time of day or amount of time since the last authentication). Situations that would indicate a high risk of an imposter include unusual change patterns such as a hair line that moves forward rather than recedes, an increase in hair length beyond a predefined reasonable amount during a single day, etc. With the authentication operation 44 considering the amount of correlation between authentication factors 48 (in this case, cross referencing hair length with the time of day or the amount of time since the last authentication), authentication is stronger than a conventional naïve authentication approach which simply matches current authentication factors with expected authentication factors.

Then, the controller 94 outputs an authentication result 96 based, at least in part, on the correlation result 46. That is, the controller 94 generates an authentication result 96 using the correlation result 46 as an additional input. In some standard multifactor authentication arrangements, the correlation result 46 is a correlation score and the controller 94 compares the correlation score to a predefined correlation threshold to determine whether the amount of correlation between the first and second authentication factors 48 is acceptable. Similarly, in some risk-based authentication arrangements, the correlation result 46 is correlation score and the controller 94 provides the correlation score to a risk engine which uses the correlation score as a risk-based authentication input to an adaptive authentication operation. In these arrangements, a correlation score indicating poor correlation between authentication factors 48 with strong interdependence is an indication of inconsistency perhaps due to an attack (i.e., an indication of increased risk).

It should be understood that the above-described technique of obtaining the biometric input 74 is non-invasive to the user 72. In particular, there is no physical contact with the user 72 required. Rather, the user 72 is physically separated from the microphone 76 and the camera 78 of the user apparatus 22. During operation, the user 72 simply moves his or her head into proximity of the microphone 76 and the camera 78. Moreover, there is no other special hardware required. Rather, the technique simply leverages off of the existing equipment of the user apparatus 22.

Based on the correlation result 46, the controller 94 of the authentication server 24 generates an authentication result 96 which is then used to control access 100 to computerized resources 50. For example, the controller 94 sends an authentication result signal 102 containing an authentication result 96 to the resource provider 26 (also see FIGS. 1 and 2). Alternatively, the controller 94 may send the authentication result signal 102 to the user 72 apparatus 22 to allow access or deny access to the computerized resource 50 (e.g., a resource of the resource provider 26 which is external to the user apparatus 22, a resource within the user apparatus 22, combinations thereof, etc.).

At this point, it should be understood that the controller 94 of the authentication server 24 is capable of being implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 110 is capable of delivering all or portions of the software. The computer program product 110 has a non-transitory (or non-volatile) computer readable medium which stores a set of instructions which controls one or more operations controller 94. Examples of suitable computer readable storage media include tangible articles of manufacture and apparatus which store instructions in a non-volatile manner such as CD-ROM, flash memory, disk memory, tape memory, and the like. Further details will now be provided with reference to FIGS. 3 and 4.

Figure 3:
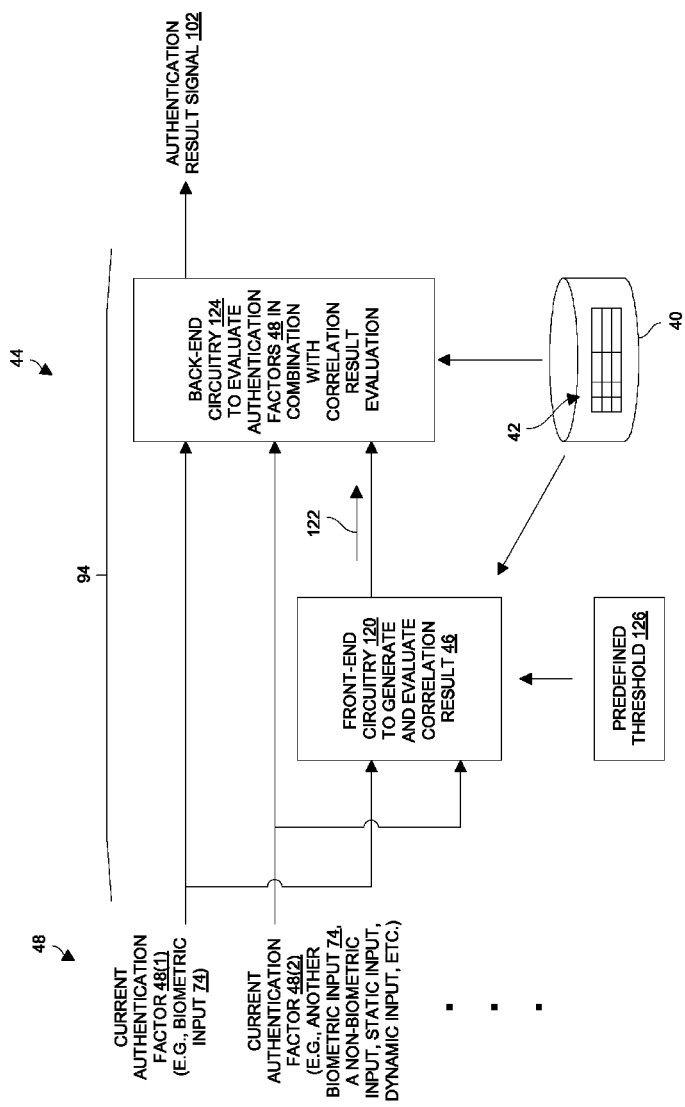
FIG. 3 is a diagram of an example multifactor authentication operation performed by the electronic environment of FIG. 1 in accordance with a first embodiment.
Figure 4:
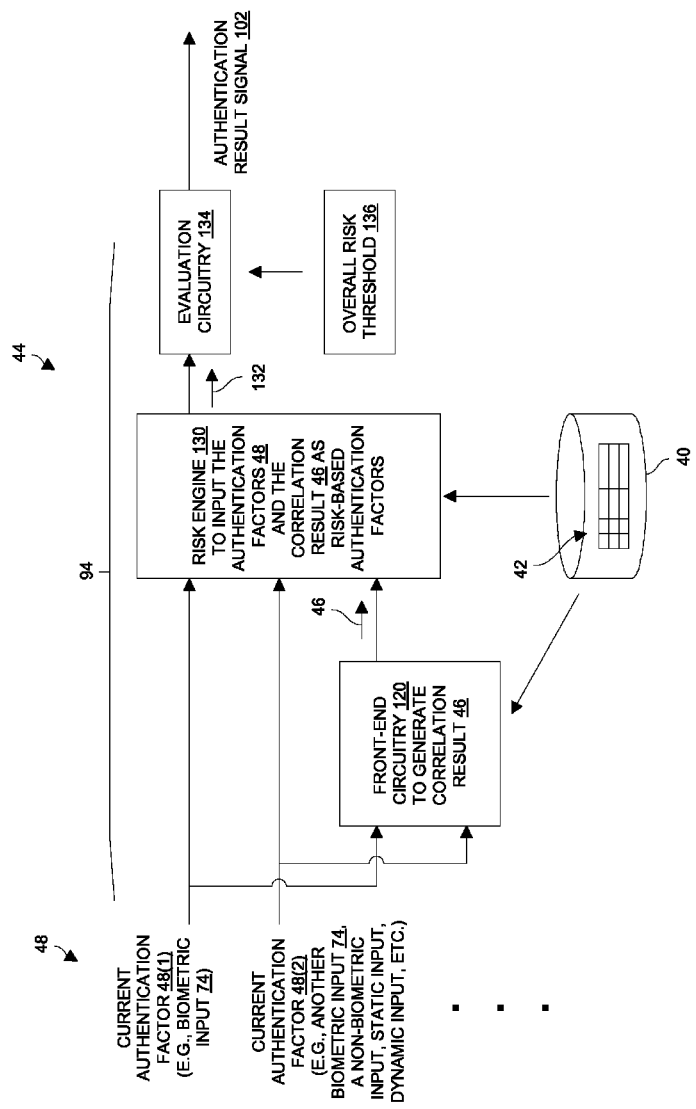
FIG. 4 is a diagram of an example risk-based authentication operation performed by the electronic environment of FIG. 1 in accordance with a second embodiment.

FIGS. 3 and 4 show example authentication operations 44 which are capable of being performed by the controller 94 of the authentication server 24. FIG. 3 shows an example authentication operation 44 which involves standard multifactor authentication. FIG. 4 shows an example authentication operation 44 which involves risk-based authentication.

As shown in the standard multifactor authentication example of FIG. 3, the controller 94 of the authentication server 24 includes front-end circuitry 120 to (i) generate a correlation result 46 from interdependent authentication factors 48 at least one being a biometric input 74, and (ii) provide an intermediate correlation output 122 indicating an assessment of the correlation result 46. The controller 94 further includes back-end circuitry 124 to (i) evaluate the authentication factors 48 in combination with the intermediate correlation output 122, and (ii) output the authentication result signal 102. In some arrangements, the circuits 120, 124 are implemented in pure hardware. In other arrangements, the circuits 120, 124 are implemented as processing circuitry running software.

In particular, the front-end circuitry 120 receives at least two current authentication factors 48(1), 48(2) and generates a correlation result 46 based on these current authentication factors 48. To test for correlation, the front-end circuitry 120 may retrieve an expected authentication factor 48 from a user profile 42 in the user database 40 and adjust the expected authentication factor 48 based on the one of the current authentication factors 48 (e.g., a time element).

It should be understood that, although at least one of the current authentication factors 48 is a biometric input 74 (e.g., audio 80 of the user, video 82 of the user, etc.), a variety of different inputs are suitable as the authentication factors 48. For example, in some arrangements, both authentication factors 48 are biometric inputs 74. In other arrangements, one authentication factor 48 is biometric and the other is non-biometric. In some arrangements, at least one authentication factor 48 is dynamic (i.e., the input is expected to change over time). In other arrangements, at least one authentication factor 48 is static (i.e., the input is not expected to change over time).

During operation, the front-end circuitry 120 generates a correlation result 46 which identifies an amount of correlation between the factors 48 (also see the correlation results 46 in FIGS. 1 and 2). In some arrangements, the correlation result 46 is a score (i.e., a value) within a possible range of scores. In these arrangements, the circuitry 120 compares the correlation result 46 to a predefined threshold 126. The intermediate correlation output 122 then indicates whether the correlation score exceeds or falls below the predefined threshold 126. In particular, acceptable correlation exists between the authentication factors 48 when the correlation score exceeds the predefined threshold. However, unacceptable correlation exists between the authentication factors 48 when the correlation score is less than the predefined threshold signaling higher risk.

Next, the back-end circuitry 124 evaluates the current authentication factors 48 against expected authentication factors 48 (i.e., a similarity assessment). Along these lines, the circuitry 124 accesses a user profile 42 from the user database 40 to determine the expected authentication factors 48. The back-end circuitry 124 then compares the current authentication factors 48 to the expected authentication factors 48 in a standard multifactor authentication manner. In particular, the circuitry 124 compares a current first authentication factor 48 (e.g., a pulse waveform) to an expected first authentication factor 48 (e.g., as a way to identify the user based on cardiac information). Additionally, the circuitry 124 compares a current second authentication factor 48 (e.g., a facial geometries) to an expected second authentication factor 48 (e.g., as a way to identify the user based on face recognition), and so on. In some arrangements, the circuitry 124 compares a current set of facial images of the person against a previously generated template.

Additionally, the circuitry 124 takes the intermediate correlation output 122 as an input, and provides the authentication result signal 102 based on the intermediate correlation output 122. In some arrangements, the circuitry 124 treats the intermediate correlation output 122 as just another factor. In other arrangements, the circuitry 124 modifies its operation based on the intermediate correlation output 122 (e.g., selects tolerances or acceptable difference ranges based on whether the intermediate correlation output 122 indicates high or low correlation), and so on.

As shown in the adaptive authentication example of FIG. 4, the controller 94 of the authentication server 24 includes front-end circuitry 120 to generate a correlation result 46 from interdependent authentication factors 48. The controller 94 further includes a risk engine 130 to perform a risk-based authentication operation which (i) evaluates the authentication factors 48 in combination with the intermediate correlation output (i.e., correlation result 46), and (ii) outputs an overall risk score 132. Furthermore, the controller 94 includes circuitry 134 which compares the overall risk score 132 to an overall risk threshold 136 and outputs the authentication result signal 102. Again, these circuits may be implemented in pure hardware, or as processing circuitry running software.

In particular, the front-end circuitry 120 receives at least two current authentication factors 48(1), 48(2) and generates a correlation result 46 based on these current authentication factors 48. Again, it should be understood that, although at least one of the current authentication factors 48 is a biometric input 74 (e.g., audio 80 of the user, video 82 of the user, etc.), a variety of different inputs are suitable as the authentication factors 48. The circuitry 120 may access the user database 40 to obtain and adjust expected authentication results 48 to evaluate correlation.

During operation, the front-end circuitry 120 generates, as a correlation result 46, a correlation score which identifies an amount of correlation between the factors 48 (also see the correlation results 46 in FIGS. 1 and 2). Again, the front-end circuitry 120 is capable of accessing a user profile 42 of the user database 40 and adjusting an expected biometric authentication factor 48 (e.g., hair length) based on another authentication factor 48 (e.g., elapsed time since the last successful authentication).

Next, the risk engine 130 evaluates the current authentication factors 48 against expected authentication factors 48. Along these lines, the circuitry 124 accesses the user profile 42 from the user database 40 to determine the expected authentication factors 48. In particular, the risk engine 130 compares the current authentication factors 48 to expected authentication factors 48, and generates a risk score 132 based on the comparisons (e.g., applies fuzzy logic algorithms, weights, neural nets, etc.) to identify a level of risk.

The evaluation circuitry 134 then compares the overall risk score 132 to an overall risk score threshold 136 and outputs an authentication result signal 102 based on the comparison. In particular, when the overall risk score 132 is lower than the threshold 136, the authentication result signal 102 indicates that authentication is successful (i.e., the level of risk is acceptable). However, when the overall risk score 132 exceeds the overall risk score threshold 136, the authentication result signal 102 indicates that authentication is unsuccessful (i.e., the level of risk is unacceptable).

As described above in connection with FIGS. 3 and 4, the various embodiments are able to collect current user inputs, and make adjustments to expected user inputs (e.g., to adjust for age, elapsed time, time of day, etc.). Such operation may include tests for pulse and vitality, adjustments for circadian rhythm, age, elapsed time, etc., checks for consistency in gender, weight, language, and so on. Such operation provides an effective evaluation of correlation between authentication factors 48. Further details will now be provided with reference to FIG. 5.

Figure 5:
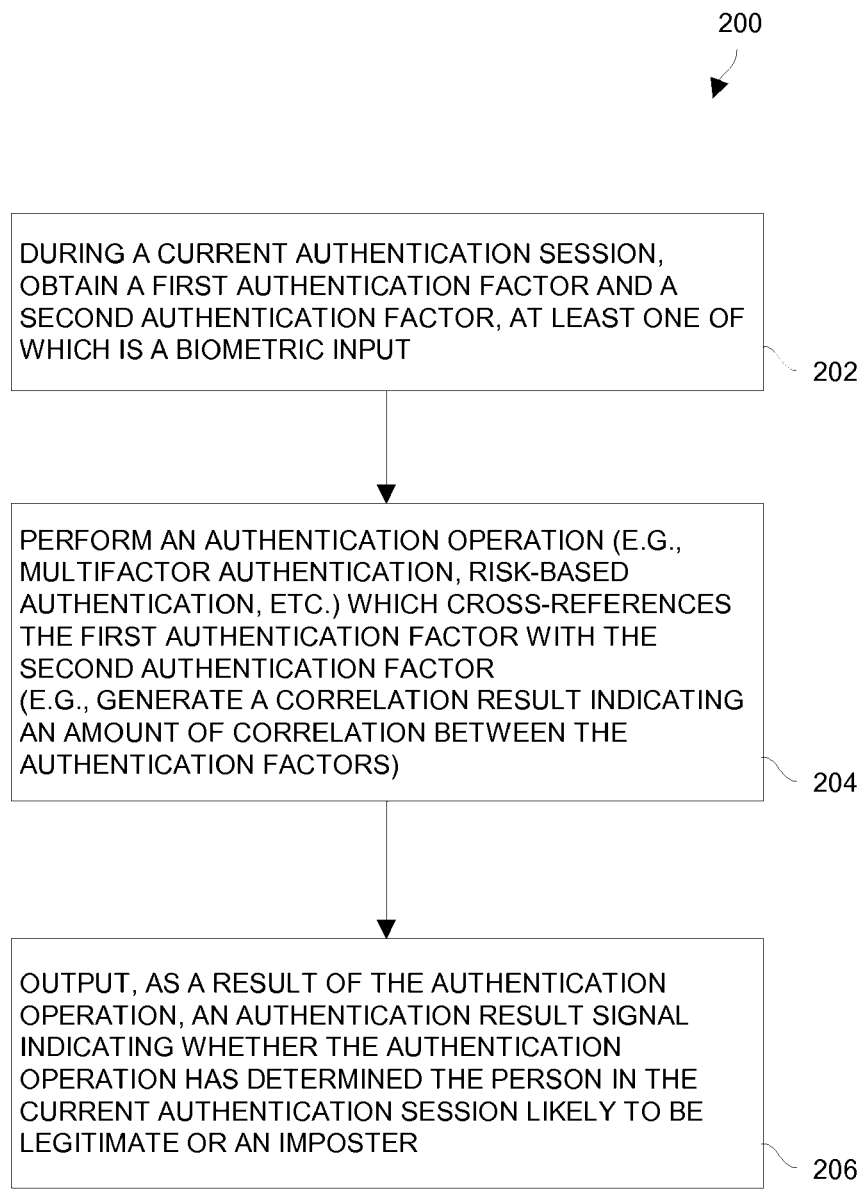
FIG. 5 is a flowchart of a procedure which is performed by circuitry of the environment of FIG. 1 when performing authentication which cross references multiple authentication factors.

FIG. 5 shows a procedure 200 which is performed by the authentication server 24 when performing authentication which cross references multiple authentication factors 48. In step 202, the authentication server 24 obtains, during a current authentication session to authenticate a person, a first authentication factor from the person and a second authentication factor from the person. At least one of the first and second authentication factors being a biometric input.

In step 204, the authentication server 24 performs an authentication operation which cross references the first authentication factor with the second authentication factor. As described earlier, the authentication operation may involve multifactor authentication (see FIG. 3). Alternatively, the authentication operation may involve risk-based authentication (see FIG. 4). In both situations, the authentication server 24 identifies an amount of correlation between the first and second authentication factors and determines whether that amount of correlation is acceptable. Such a consistency evaluation may involve a check for a rapid change hair length, weight, etc. A low amount of correlation indicates higher risk of attack.

In step 206, the authentication server 24 outputs, as a result of the authentication operation, an authentication result signal indicating whether the authentication operation has determined the person in the current authentication session likely to be legitimate or an imposter. This authentication result signal is capable of controlling access to a resource (also see FIG. 1). In some situations, when the authentication result signal indicates unsuccessful authentication, the person can be re-challenged before finally denying access to the resource.

As described above, an improved technique involves authentication which cross references multiple authentication factors 48, at least one of the authentication factors 48 being a biometric input 74. Such cross referencing enables the amount of correlation between authentication factors 48 to influence the authentication result. Poor correlation between authentication factors 48 with strong interdependence is a sign of inconsistency perhaps due to an attack, e.g., an imposter posing as the legitimate person or a replay of an authentication factor. As a result, such improved authentication which cross references authentication factors 48 is capable of providing stronger authentication than conventional naïve authentication.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the biometric input described above was provided by way of example only. Other biometrics are suitable for use as well. Along these lines, the authentication factors 48 may include relatively weak identifiers that may not uniquely identify a person alone (e.g., age, gender, height/gait, language, etc.), but that yield less false positive authentication results when combined with or when used with other biometric and/or non-biometric authentication factors 48.

In some arrangements, biometrics are obtained transparently from the user (e.g., gait using the accelerometers in a smart phone, geo location using GPS circuitry, etc.). Such modifications and enhancements are intended to belong to various disclosed embodiments.

What is claimed is:

1. In electronic circuitry, a method of authenticating a person, the method comprising:
during a current authentication session to authenticate the person, obtaining a first authentication factor from the person and a second authentication factor from the person, at least one of the first and second authentication factors being a biometric input;
performing an authentication operation which cross references the first authentication factor with the second authentication factor; and
outputting, as a result of the authentication operation, an authentication result signal indicating whether the authentication operation has determined the person in the current authentication session likely to be legitimate or an imposter,
wherein performing the authentication operation which cross references the first authentication factor with the second authentication factor includes:
generating a correlation result based on an amount of correlation between the first authentication factor and the second authentication factor;
wherein the authentication result signal is based on the correlation result;
wherein the first authentication factor is a first biometric input;
wherein the second authentication factor is a second biometric input; and
wherein generating the correlation result based on the amount of correlation between the first authentication factor and the second authentication factor includes providing, as the correlation result, a correlation score indicating the amount of correlation between the first biometric input and the second biometric input;
wherein performing the authentication operation further includes providing the correlation result to a risk engine which is constructed and arranged to perform an adaptive authentication operation based on the correlation result, the authentication result signal being outputted by the risk engine and being based on the correlation result;
further comprising the risk engine comparing authentication factors from the current authentication session to expected authentication factors, wherein the expected authentication factors are received from a user profile; and
further comprising performing a vitality test, adjusting the test for circadian rhythm, age and elapsed time since a last successful authentication, and comparing against the user profile.

2. A method as in claim 1 wherein performing the authentication operation further includes:
performing multifactor authentication based on (i) the first authentication factor, (ii) the second authentication factor, and (iii) the correlation result to produce the authentication result signal.

3. A method as in claim 2 wherein performing multifactor authentication includes:
performing a first comparison operation which compares the first authentication factor to a first expected factor,
performing a second comparison operation which compares the second authentication factor to a second expected factor, and
performing an evaluation of the correlation result; and
wherein the authentication result signal is based on results of the first comparison operation, the second comparison operation and the evaluation of the correlation result.

4. A method as in claim 3 wherein the correlation result is a correlation score indicating the amount of correlation between the first authentication factor and the second authentication factor; and wherein performing the evaluation of the correlation result includes:

performing a third comparison operation which compares the correlation score to a predefined correlation threshold, the authentication result signal being based on results of the first comparison operation, the second comparison operation and the third comparison operation.

5. A method as in claim 3 wherein outputting the authentication result signal indicating whether the authentication operation has determined the person in the current authentication session likely to be legitimate or an imposter includes:
indicating (i) successful authentication only when all of the comparison operations provide positive outcomes, and (ii) unsuccessful authentication when at least one comparison operation does not provide a positive outcome.

6. A method as in claim 1 wherein the correlation result is a correlation score indicating the amount of correlation between the first authentication factor and the second authentication factor; and wherein providing the correlation result to the risk engine includes:
inputting, as a risk-based authentication factor, the correlation score into the risk engine, the authentication result signal being based on the correlation score.

7. A method as in claim 6 wherein performing the authentication operation further includes:
inputting, as additional risk-based authentication factors, the first and second authentication factors into the risk engine, the authentication result signal being further based on the first and second authentication factors.

8. A method as in claim 1 wherein the first authentication factor is a biometric input;
wherein the second authentication factor is a non-biometric input; and
wherein generating the correlation result based on the amount of correlation between the first authentication factor and the second authentication factor includes providing, as the correlation result, a correlation score indicating the amount of correlation between the biometric input and the non-biometric input.

9. A method as in claim 8 wherein the biometric input includes a current set of facial images of the person captured during the current authentication session through a digital camera of a computerized device;
wherein the non-biometric input includes a current time of the current authentication session; and
wherein providing the correlation score includes (i) generating an expected measurement of the current set of facial images of the person based on a previous measurement of a previous set of facial images of the person captured during a previous authentication session, and (ii) comparing a current measurement of the set of facial images to the expected measurement of the set of facial images.

10. A method as in claim 9 wherein performing the authentication operation further includes:
comparing the current set of facial images of the person against a previously generated template.

11. A method as in claim 9 wherein the current measurement of the current set of facial images includes a current pulse waveform derived from the current set of facial images;
wherein the expected measurement of the current set of facial images includes an expected pulse waveform for the current set of facial images; and
wherein providing the correlation score further includes generating a difference between the current pulse waveform and the expected pulse waveform.

12. A method as in claim 1 wherein the biometric input includes current video of the person captured during the current authentication session through a digital camera;
wherein the second biometric input includes current audio of the person captured during the current authentication session through a microphone;
wherein the digital camera and the microphone are co-located on a common computing device; and
wherein providing the correlation score includes (i) comparing the current video with the current audio and (ii) generating, as the correlation score, a value indicating how well the current video matches with the current audio.

13. A method as in claim 12 wherein performing the authentication operation which cross references the first authentication factor with the second authentication factor further includes:
performing a dynamic facial recognition operation based on the current video of the person captured during the current authentication session through the digital camera, and
performing a dynamic voice recognition operation based on the current audio of the person captured during the current authentication session through the microphone.

14. A method as in claim 1 wherein one of the first and second biometric input includes video input which provides cardiac identification information about the person.

15. A method as in claim 14 wherein the cardiac information identifies a pulse waveform for use in (i) identifying the person and (ii) indicating vitality as part of a concurrent vitality test.

16. A method as in claim 1 wherein performing the authentication operation which cross references the first authentication factor with the second authentication factor includes generating a correlation result based upon an interdependence between the first authentication factor and the second authentication factor.

17. A method as in claim 16 wherein generating the correlation result based upon the interdependence further includes at least one of applying fuzzy logic algorithms, generating weight values for each authentication factor, and applying neural nets, to generate the correlation result for the cross referenced authentication factors.

18. A method as in claim 1, wherein:
performing the authentication operation includes a server receiving the first and second authentication factors during the current authentication session and generating the correlation result;
wherein providing the correlation score includes providing the correlation score to a risk engine; and
wherein outputting an authentication result signal includes generating a risk-based score based on the correlation result and the authentication factors is performed by the risk engine.

19. A method as in claim 1, further comprising generating, by the risk engine, a risk score based upon the vitality test, comparing the risk score to a risk threshold, and outputting an authentication result signal.

20. An electronic system to authenticate a person, the electronic system comprising:
receiving circuitry to obtain, during a current authentication session to authenticate the person, a first authentication factor from the person and a second authentication factor from the person, at least one of the first and second authentication factors being a biometric input;

processing circuitry coupled to the receiving circuitry to perform an authentication operation which cross references the first authentication factor with the second authentication factor; and outputting circuitry coupled to the processing circuitry to output, as a result of the authentication operation, an authentication result signal indicating whether the authentication operation has determined the person in the current authentication session likely to be legitimate or an imposter;

wherein the processing circuitry performing the authentication operation which cross references the first authentication factor with the second authentication factor is constructed and arranged to generate a correlation result based on an amount of correlation between the first authentication factor and the second authentication factor;

wherein the authentication result signal is based on the correlation result;

wherein the first authentication factor is a first biometric input;

wherein the second authentication factor is a second biometric input; and wherein, when constructed and arranged to generate the correlation result based on the amount of correlation between the first authentication factor and the second authentication factor, the processing circuitry is further constructed and arranged to provide, as the correlation result, a correlation score indicating the amount of correlation between the first biometric input and the second biometric input;

wherein the processing circuitry performing the authentication operation further includes providing the correlation result to a risk engine which is constructed and arranged to perform an adaptive authentication operation based on the correlation result, the authentication result signal being outputted by the risk engine and being based on the correlation result;

further comprising the risk engine comparing authentication factors from the current authentication session to expected authentication factors, wherein the expected authentication factors are received from a user profile; and further comprising performing a vitality test, adjusting the test for circadian rhythm, age and elapsed time since a last successful authentication, and comparing against the user profile.

21. A computer program product which includes a non-transitory computer readable medium storing a set of instructions to authenticate a person, the set of instructions causing computing circuitry to perform a method, comprising:

during a current authentication session to authenticate the person, obtaining a first authentication factor from the person and a second authentication factor from the person, at least one of the first and second authentication factors being a biometric input;

performing an authentication operation which cross references the first authentication factor with the second authentication factor; and outputting, as a result of the authentication operation, an authentication result signal indicating whether the authentication operation has determined the person in the current authentication session likely to be legitimate or an imposter;

wherein performing the authentication operation which cross references the first authentication factor with the second authentication factor includes:

generating a correlation result based on an amount of correlation between the first authentication factor and the second authentication factor;

wherein the authentication result signal is based on the correlation result;

wherein the first authentication factor is a first biometric input;

wherein the second authentication factor is a second biometric input; and wherein generating the correlation result based on the amount of correlation between the first authentication factor and the second authentication factor includes providing, as the correlation result, a correlation score indicating the amount of correlation between the first biometric input and the second biometric input;

wherein performing the authentication operation further includes providing the correlation result to a risk engine which is constructed and arranged to perform an adaptive authentication operation based on the correlation result, the authentication result signal being outputted by the risk engine and being based on the correlation result;

further comprising the risk engine comparing authentication factors from the current authentication session to expected authentication factors, wherein the expected authentication factors are received from a user profile; and further comprising performing a vitality test, adjusting the test for circadian rhythm, age and elapsed time since a last successful authentication, and comparing against the user profile.

* * * * *